United States Patent [19]

Bauer et al.

[11] Patent Number: 5,758,333
[45] Date of Patent: May 26, 1998

[54] DATA MANAGEMENT SYSTEM INCLUDING USER-INDEPENDENT GENERIC DATABASE

[75] Inventors: Astrid Bauer, Dachau; Günther Mohr, Olching; Bernd Siegwart, Ettringen, all of Germany

[73] Assignee: Siemens Aktiengesellschaft, Munich, Germany

[21] Appl. No.: 765,964

[22] PCT Filed: May 3, 1995

[86] PCT No.: PCT/EP95/01680

§ 371 Date: Nov. 12, 1996

§ 102(e) Date: Nov. 12, 1996

[87] PCT Pub. No.: WO95/30959

PCT Pub. Date: Nov. 16, 1995

[30] Foreign Application Priority Data

May 10, 1994 [EP] European Pat. Off. ............ 94107310

[51] Int. Cl.⁶ .................................................. G06F 17/30
[52] U.S. Cl. ............................... 707/1; 707/2; 707/102
[58] Field of Search ........................... 707/1, 2, 102

[56] References Cited

U.S. PATENT DOCUMENTS 5,555,409  9/1996  Leenstra, Sr. et al. ............ 707/101
5,584,026  12/1996  Knudsen et al. ................ 707/1
5,594,899  1/1997  Knudsen et al. ................ 707/2

FOREIGN PATENT DOCUMENTS 0 420 419  4/1991  European Pat. Off. .
0 425 222  5/1991  European Pat. Off. .
0 525 946  2/1993  European Pat. Off. .

Primary Examiner—Paul V. Kulik
Attorney, Agent, or Firm—Hill & Simpson

[57] ABSTRACT

A data management system should relieve the user of data management tasks as much as possible and nevertheless be flexible with respect to user-individual forms of the user data.

This aim is achieved according to the invention by a generic database (GDB) having a central control system (CU) and generic data modules (GM), the generic data modules already containing all the functionality to carry out access control and data maintenance in cooperation with the central control system, and the generic data modules nevertheless allowing a user-individual form of the user data.

4 Claims, 6 Drawing Sheets

DATA MANAGEMENT SYSTEM INCLUDING USER-INDEPENDENT GENERIC DATABASE

BACKGROUND OF THE INVENTION

1. Field of the Invention

The present invention relates generally to a data management system using a database with central control and data modules.

2. Description of the Related Art

In a real-time system, in particular a switching system, large volumes of data, that are to some extent complexly interrelated, have to be managed. These data must be accessed in real time, i.e. as quickly and reliably (in other words, consistently) as possible.

In European patent document EP-A2-042522 there is described a database management system with a data dictionary, the application and the database management system being separate from one another to the extent that their communication takes place via the operating system (using I/O interrupts) and the data managed by the database management system being stored on disk. This separation is very disadvantageous with regard to the request for real-time capability.

In the case of previously known switching systems, the various user systems are themselves responsible for the data modules, types of addressing and access procedures. This has the result that in each user system there are individual ways of implementing identical functions. In addition, the lack of a uniform structure makes it difficult to maintain an overview and to support external object-oriented accesses (CMISE).

Until now, data consistency has likewise been ensured at the user level. This has the consequence of a coarse granularity with respect to access control. Furthermore, the methods of ensuring consistency restrict system availability. In addition, the ensuring of consistency is made more difficult by the possibility of direct data access. For example, as a result access conflicts can be identified only with difficulty.

SUMMARY OF THE INVENTION

The present invention is based on the object of providing a data management system which relieves the user of access control tasks and data maintenance tasks and which is nevertheless flexible with respect to user-individual forms of the user data.

This and other objects and advantages of the present invention are achieved by a data management system having a) a user-independent generic base system, which comprises a central control system and at least one generic data module, b) a central access control system, which is contained in the central control system and controls accesses to user data on a central level, c) a local access control system, which in each case is contained in a generic data module, and which controls accesses to user data on a local level, the local access control system thereby cooperating correspondingly with the central access control system, d) a user-specific data module system, d1) which comprises at least one user-specific data module, a user-specific data module being produced by defining user-specific data types from a generic data module, and d2) which comprises at least one user access procedure, which is exported with respect to a user system, and which represents the only interface of a user system to the data management system.

The (central and local) access control system has the effect that a user system of the data management system is relieved of access control tasks (for example controlling data consistency in access sequences), controlling access conflicts in the case of parallel accesses by a plurality of users) and, as a result, increases the availability of the user system correspondingly.

The exclusive communication by the user with the data management system via access procedures which are exported from the data management system has the effect of ensuring good data encapsulation with respect to the user. As a result, it is easier to identify access conflicts, which are likewise handled by the access control system.

Finally, the indirect data access has the effect of freeing the user to the greatest extent of data management functions.

By instantiation or instancing of the generic modules, i.e. by defining user-specific data types and parameters for them, it is made possible in a simple way to produce from the generic modules application-specific data modules (user modules) which are guaranteed to operate error-free with respect to the complex functionality (for example with respect to ensuring data consistency), since the instantiation or instancing has the effect that the entire functionality of the underlying generic module is automatically taken over.

Since identical functions of different user modules consequently then only have to be implemented a single time, namely in the common generic module (generic functions), the effort involved in implementation, testing and maintenance is in each case restricted to the generic module.

In addition, the uniform structures of the generic modules have the effect of facilitating external object-oriented accesses (CMISE).

An embodiment of the invention provides a user access procedure built up from a combination of standard access procedures, the standard access procedures being contained in the respective local access control systems and containing interfaces to the central access control system. The introduction of user access procedures which are built up from standard access procedures achieves the effect that the respective application is independent of the logical data structures of the application.

In an application access procedure (a view procedure), one or more object classes are accessed. One object class is managed in one user module. An application access procedure contains as parameters the desired attributes of the object classes affected by the access, these parameters being return parameters, which are returned to the application after execution of the user access procedure. Consequently, the user access procedure has the effect of providing the application with its own way of viewing the stored application data. Changes to the logical data structures consequently have no effects on the applications.

DETAILED DESCRIPTION OF THE PREFERRED EMBODIMENTS

Figure 1:
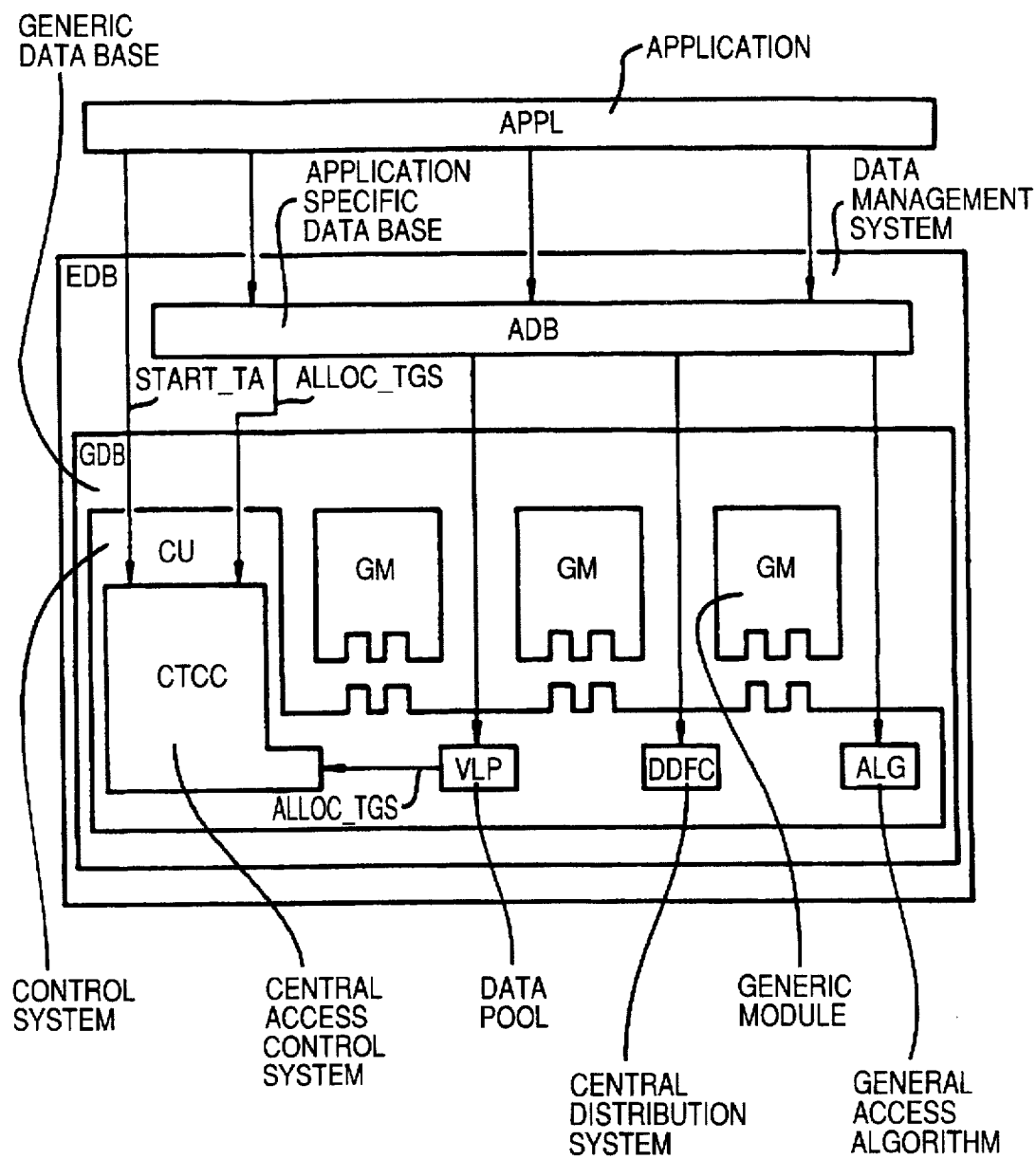
FIG. 1 is a schematic diagram of the present data management system.

An exemplary embodiment of the invention is explained in more detail below with reference to the drawing.

In the drawing, the arrows between the blocks represent a functional relationship (for example a procedure call, the head of an arrow pointing to the procedure being called up).

Figure 2:
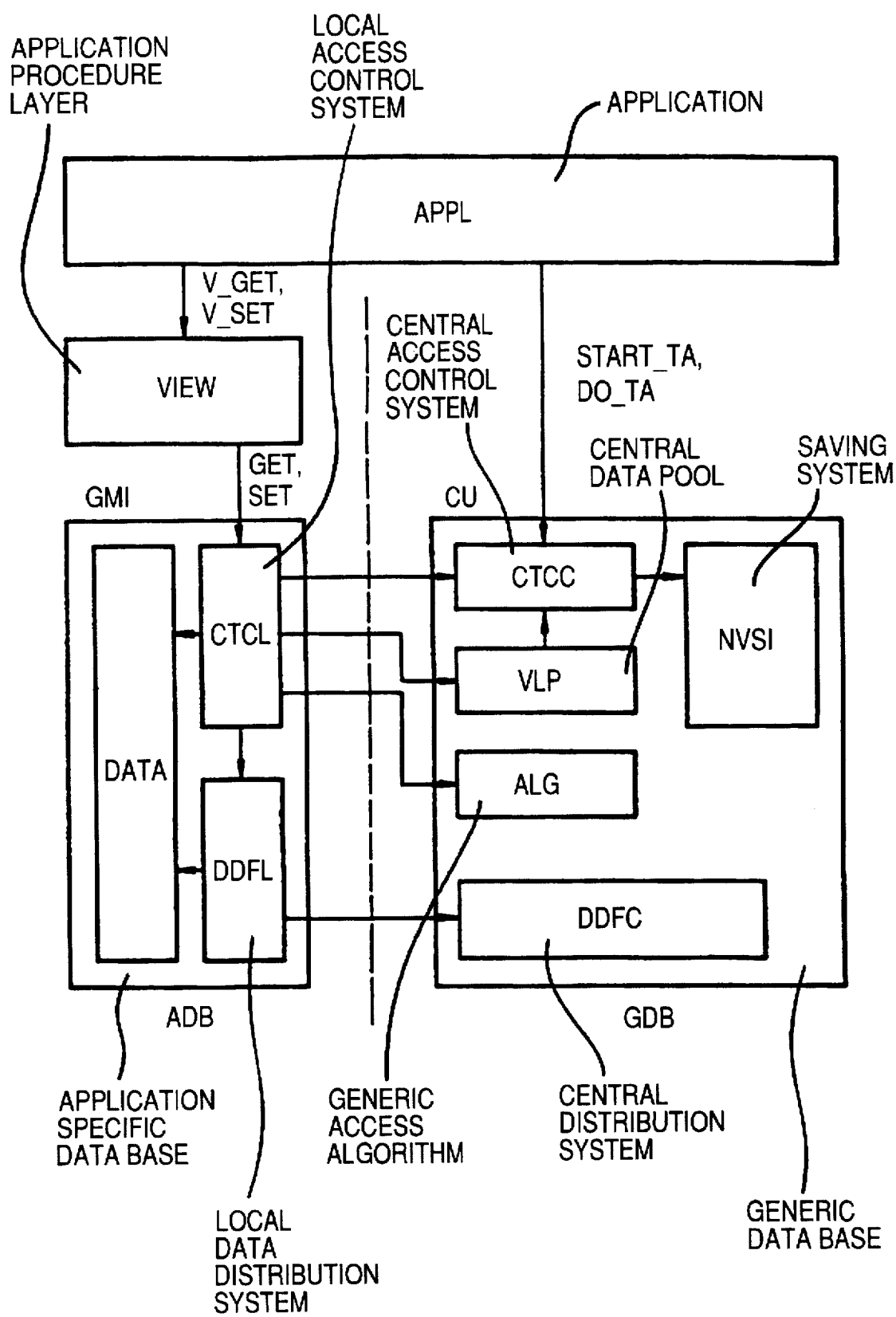
FIG. 2 is a schematic diagram of the data management system.

FIG. 1 and FIG. 2 show the structure of the data management system EDB according to the invention, which can be accessed by various applications APPL.

The data management system comprises two layers, namely an application-specific system layer, which is referred to in the following as application-specific database ADB, and an application-independent system layer, which is referred to in the following as a generic database GDB.

The generic database GDB comprises central and local functions, the central functions being realized in a central control system CU and the local functions being realized in generic modules GM.

The central control system CU contains a central access control system CTCC, which centrally controls accesses (either individual accesses or access sequences), general access algorithms ALG, a saving system NVSI, which implements the access to a backup storage for saving the user data, and a central distribution system DDFC, which serves for distributing updated user data to the various processors of the real-time system. Optionally, a data pool VLP for managing data of variable length may also be added without influencing the existing functions.

A generic module GM represents a definition module (or template) for the description of a data container, which contains data structures for storing the user data and also the access structures required for this purpose, i.e. addressing methods and elementary access procedures. In addition, the generic modules contain additional structures for supporting the central functional system, i.e. structures for supporting coordination and ensuring consistency (which here is a access control system CTCL), and also structures for supporting the distribution of the user data to various platforms (which here is a local data distribution system DDFL). The description of the structures in the generic module in this case takes place in a way independent of the user, i.e. in a way independent of the data layout of the data structures.

Different types of generic modules are produced by combining modules (for example the local access control system CTCL, the local distribution system DDFL and additional data definitions necessary for this, various addressing methods). The variants are determined by the requirements arising from the data modelling of the corresponding application.

Each generic module contains a set of elementary access procedures concerning the control of an individual access. This set comprises a procedure GET for reading a data element (attribute), a procedure SET for modifying a data element, and also procedures CREATE and DELETE for creating and deleting data elements of the user. Access to the data of a user is possible only by means of these special access procedures (data encapsulation). Data with a corresponding persistent requirement are saved in the core-image format on a backup storage. This ensures that the current data are available as quickly as possible after a restart of the switching computer with the associated loading operation.

The application-specific database ADB comprises views and module instances, the module instances being produced from the generic modules by instantiation. The instantiation or instancing has the effect of defining user-specific data types and parameters for the generic module. A module instance is therefore also referred to in the following as a user-specific data module or as a user module.

The views form the interface with the current application APPL. They consequently represent the logical picture of the conceptual data module of this application.

The access control system controls access by users to the data management system EDB and thereby ensure that an updating operation takes the data management system from a consistent initial state into a consistent end state. To ensure this consistency, the access control system handles access sequences (transactions or reading sequences) in an integral (atomic) way, i.e. a transaction is, for example, either carried out in its entirety or rejected in its entirety.

In addition, the access control system coordinates the simultaneous access of access sequences parallel to one another.

The access control system comprises the central control CTCC, which carries out for the user those control jobs (for example START_TA, DO_TA, ABORT_TA) which concern the controlling of an access sequence in its entirety.

The central data pool VLP manages semi-permanent and transient data of variable length. It comprises both the data and a set of primitives, in order to store and manipulate the data looked after by it.

All the data managed by the central data pool are encapsulated by the data pool. All accesses to these data can thus take place only via the primitives. The module instances can have a block of any desired length reserved from the data pool, each reserved data block being identified by a logical key assigned during its reservation.

The generic access algorithms ALG comprise functions which are common to all the generic modules, namely on the one hand algorithms for the logical organization of the data maintenance (for example linked list, binary tree), on the other hand mechanisms for physically storing the data, i.e. data-structure-independent paths through database-internal management or access structures. The generic access algorithms are called up exclusively from the generic modules.

The central distribution system DDFC controls the transfer of user data from one platform (processor) to other platforms (processors) and thereby ensures data consistency between various platforms (processors). The central distribution system DDFC is dynamically called up from a local distribution system DDFL of a user specific data module GMI.

As already mentioned, a generic module serves as a template for a data container, which describes a specific data structure (for example a sorted list, a binary tree) and also specific access algorithms for this data structure in an application-independent way, i.e. in a manner independent of the data layout. A generic module comprises a set of elementary access procedures to the data management system, which it makes available to the respective application in order in this way to realize a reading or writing access to the data contained in the generic database GDB.

On account of the internal architecture of a generic module, which distinguishes between data-structure-specific parts and general parts of the data access and of the data handling, general functions can be declared as generic algorithms ALG, which can be used by each generic module, since they are contained in the central module CM of the generic database. In addition, the generic modules use other general functions, which are made available by the central access control system CTCC and the data pool VLP.

A main purpose of the introduction of generic modules is the reusability and resubstitutability of software. The generic modules form a library, from which application-specific data modules can be produced by instantiation, i.e. by the substituting of general data layout information (space savers, in the CHILL programming language for example ANY_ASSIGN) by specific layout information.

The insertion of the application procedure layer VIEW between the application and the user module achieves the effect that the respective application is independent of the logical data structures. With the aid of a user access procedure, one or more object classes are accessed, one user module in each case managing one object class. A user access procedure contains as its parameters the desired attributes of the object classes affected by the access, these parameters being return parameters, which are returned to the application after execution of the user access procedure. The user access procedure consequently has the effect of providing the application with its own way of viewing the stored application data. Changes to the logical data structures consequently have no effects on the applications.

An application or a user uses for the management of its or his user data exclusively the user access procedures VIEW. For the consistent amendment of dependent data, a corresponding sequence of user procedure calls is characterized by commands to the central access control system as a transaction. The carrying out of the transaction and also the saving of the data on the backup storage and the distribution of the data are performed in an independent way by the data management system and are consequently completely invisible for the user.

The sequence of a transaction is explained in more detail below.

Figure 3:
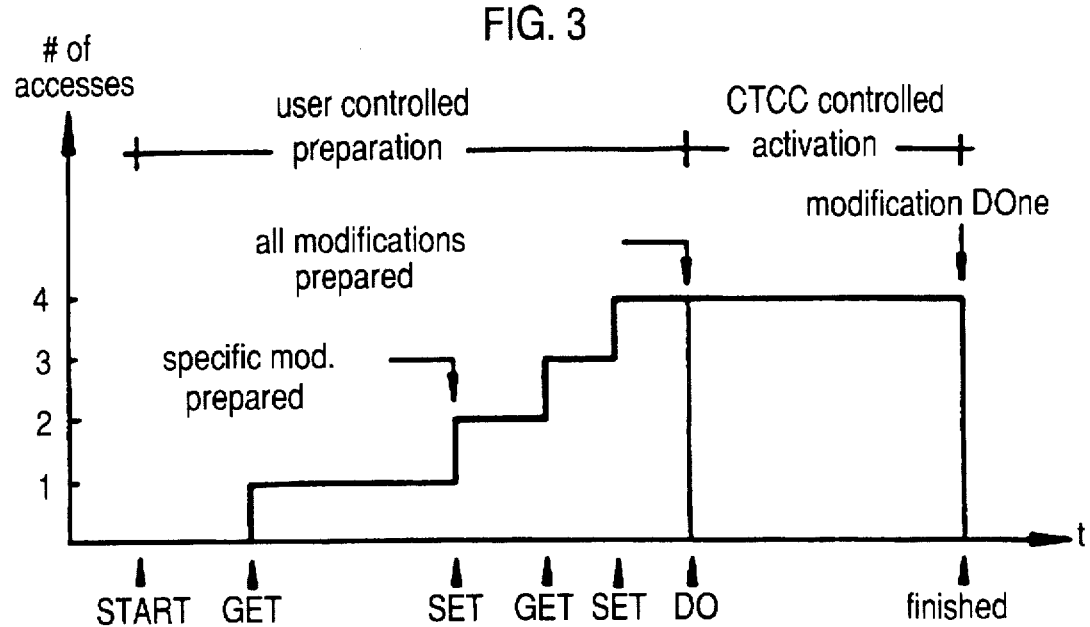
FIG. 3 is a graph showing the phases of a transaction.

FIG. 3 shows the phases of a transaction. A transaction comprises at least two phases, namely a preparation phase, which is controlled by the user, and an activation phase, which is controlled by the central access control system.

In the preparation phase, the transaction is built up step by step, in that the access procedures (SET, GET, etc.) for individual accesses are called up one after the other by the user. In principle, any number of individual accesses may be initiated within a transaction by calling up the corresponding access procedures.

The preparation phase is started by the procedure START_TA and ended by the procedure DO_TA. The procedure START_TA assigns the transaction a transaction identifier TA_ID and passes it onto the user. The user then uses this TA_ID as an input parameter when calling up the access procedures for individual accesses.

In the preparation phase, the calls of the access procedures are recorded and any amendments of the data affected by the access are prepared. In the preparation phase, the user has the possibility of rejecting the transaction by calling up the procedure ABORT_TA.

Calling up the procedure DO_TA at the same time has the effect of starting the activation phase, which is controlled exclusively by the access control system and therefore runs independently of user calls. In the activation phase, consequently no further calls for individual accesses can be taken into consideration.

Figure 4:
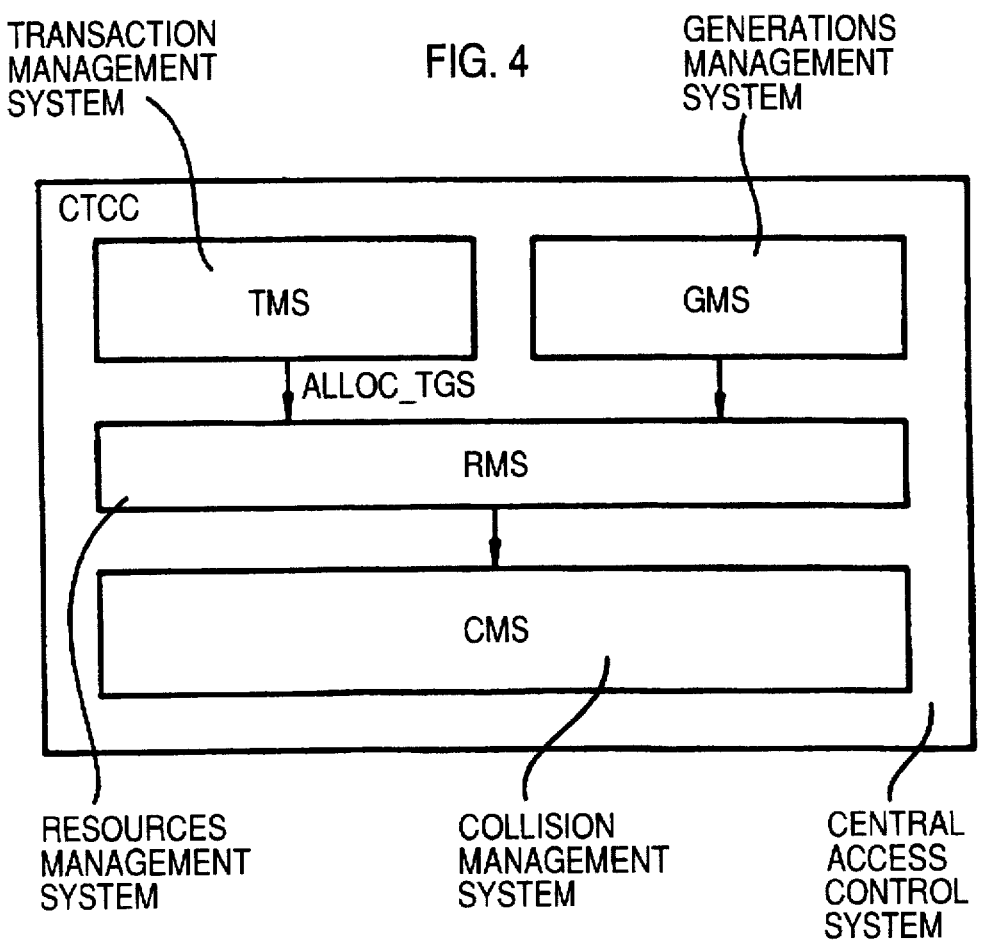
FIG. 4 is a schematic diagram of a central access control system.

In the preparation phase, the coordination of a transaction is carried out, i.e. all the collision cases with other parallel transactions are identified and coordinated. The coordination in this case takes place by those transactions which were started earlier being allowed to continue, whereas other parallel transactions are rejected by a corresponding negative acknowledgement being returned to the user. Since all collision cases are consequently resolved in the preparation phase, transactions can be carried out independently of one another in the activation phase. FIG. 4 shows the structure of the central access control system CTCC. The central access control system CTCC comprises a transaction management system TMS, a generations management system GMS, a resources management system RMS and a collision management system CMS.

The transaction management system TMS controls the transaction-oriented access to the data objects of the data management system.

The generations management system GMS manages the data generations produced in the course of transactions on the basis of a generation identifier GEN_ID allocated by the transaction management system to a transaction during the activation phase. This management comprises the updating of a newly produced data generation, i.e. the transferring of the new data generation to its final storage locations in the main memory and/or on the disc. In addition, said management comprises the controlling of reading sequences (sequences of logically associated read accesses to the data objects of the data management system).

This type of management makes it possible for a group of data objects to be read consistently within a reading sequence (i.e. all the data objects read belong to the same generation), while a transaction takes place in parallel with this.

The resources management system RMS manages access control data structures which are used by the transaction management system and/or the generations management system for controlling access.

An access control data structure TGSE is designed in the form of an SW separating filter, which comprises a first output to the old image and a second output to the new image and thus makes it possible to bring in the new image of a data object DO in parallel with the old image. Each time a TA wants to bring in a new image, an access control data structure TGSE is requested by the resource management system RMS and the access control data structure TGSE is then inserted by the transaction management system TMS into the access path.

The access control data structure TGSE not only makes possible the parallel bringing in of the new image but also, since it becomes part of the access path, additionally offers a protective mechanism in the form of an inhibiting identifier, by means of which a transaction can bar access to the data object DO and consequently prevent unallowed accesses to the new images on the part of transactions acting in parallel.

The collision management system CMS coordinates writing accesses to one and the same data object which are triggered by parallel transactions and prevents the oldest data generation from being deleted while at the same time a reading sequence wants to have reading access to data objects of this data generation.

The individual actions brought together in a transaction or a reading sequence, or to be more precise the procedures for carrying out these individual actions, are explained in more detail below with reference to FIGS. 5, 6 and 7.

Figure 5:
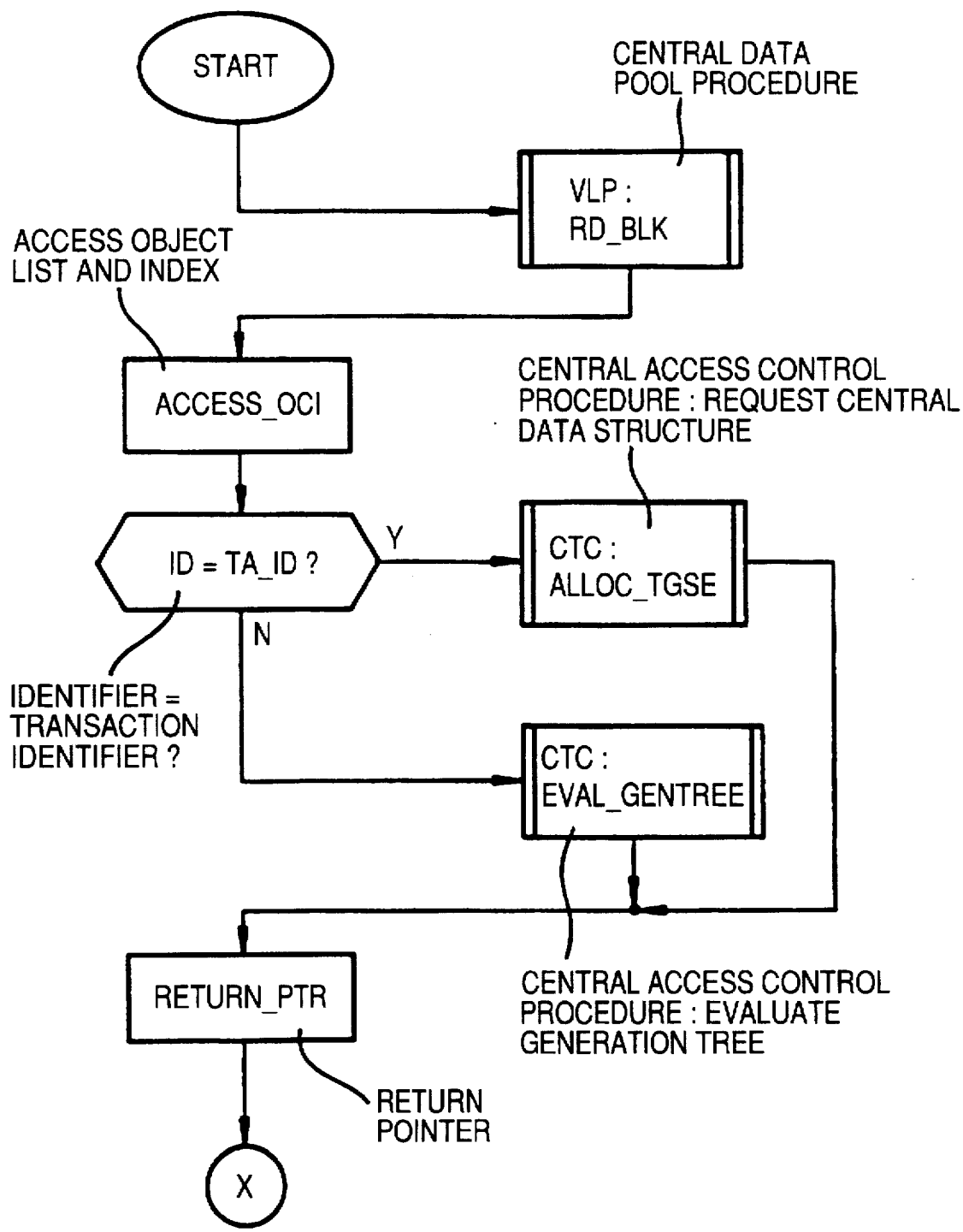
FIG. 5 is a flow diagram of a GET procedure.

FIG. 5 shows a procedure GET, which is contained in a user module and carries out an individual reading action, it being possible for it to be called up both in the course of a transaction and in the course of a reading sequence. Input parameters of the procedure GET are an identifier of the reading action and a logical key, which leads through the data access path to the data object. The identifier of the transaction is a transaction identifier TA__ID if the procedure GET is used within a transaction. In the other case, namely if the procedure GET is used within a reading sequence, the identifier is a generation identifier GEN__ID. Initial parameters of the procedure GET are the data object and a message parameter for the return of check messages.

First of all, lists of the data access path are run through on the basis of the logical key.

Figure 6:
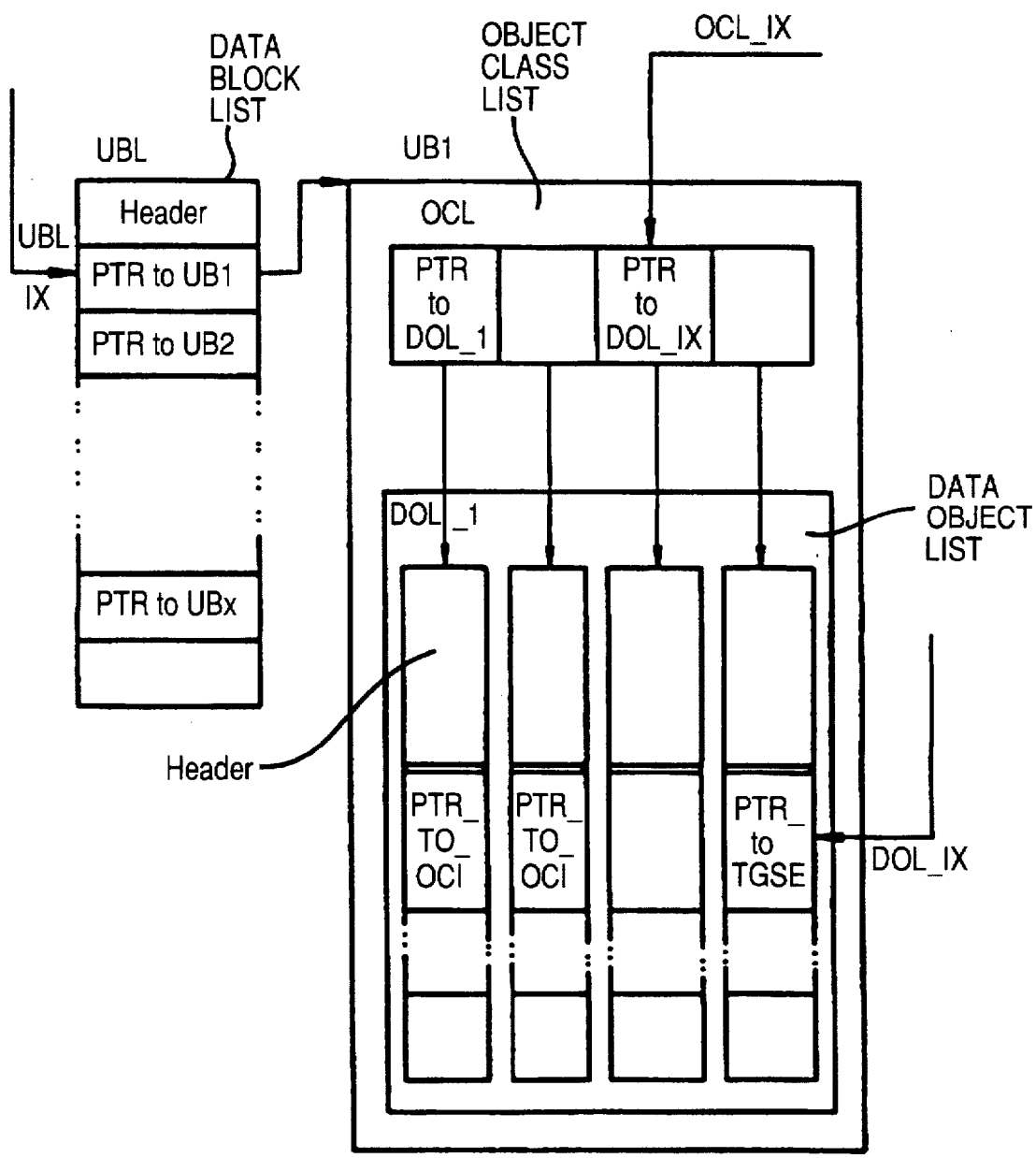
FIG. 6 is a schematic diagram of a data access path.
Figure 7:
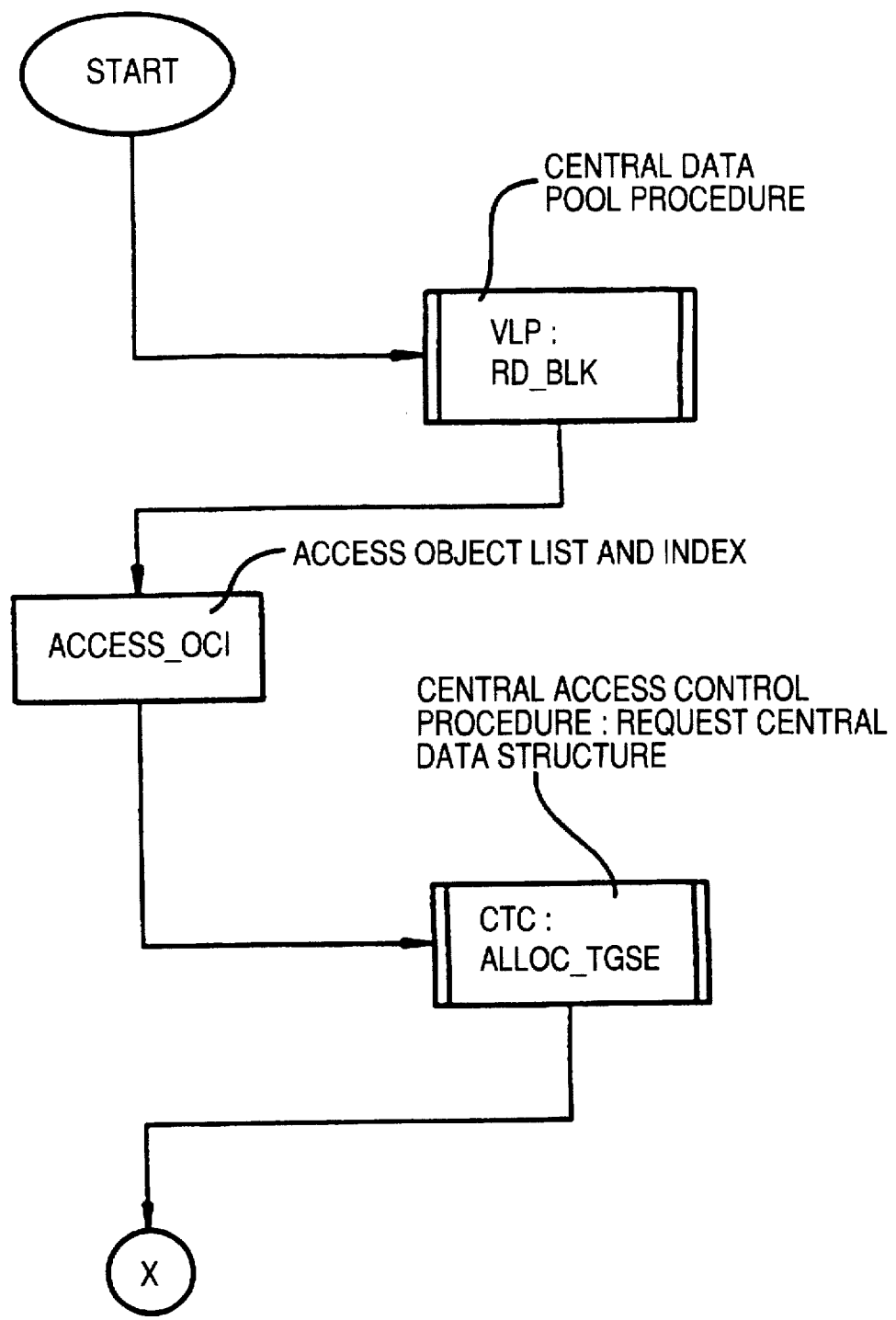
FIG. 7 is a flow diagram of a SET procedure.

FIG. 6 shows the exemplary structure of a data access path, which comprises a plurality of lists and is stored in the user-independent data module VLP. The data access path comprises a data block list UBL, the list elements of which represent pointers to data blocks UB, as well as, within a data block UB, an object class list OCL and data object lists DOL. The logical key comprises indexes of the lists, namely the indexes UBL__IX, OCL__IX and DOL__IX, on the basis of which finally the pointer to a data object or an access control data structure TGSE can be determined.

First of all the procedure GET runs through the data access path, in that it calls up the procedure RD__BLK, which is implemented in the user-independent central data pool VLP. This procedure supplies as the return value the physical pointer to a data object list DOL. In the case of a transaction, this pointer is not used until the activation phase, following the preparation phase of the transaction, in order to execute the actual access.

Next, the procedure ACCESS__OCI with the parameters "pointer to the data object list DOL" and "DOL__IX" is called up. This procedure investigates, inter alia, the header of the data object list DOL and determines whether it is a valid index in the case of the transferred parameter "DOL__IX".

If the index DOL__IX is valid, subsequently the list field of the list DOL corresponding to the index DOL__IX is analyzed. It is thereby investigated whether the identifier ID stored in the access field (firing field) of the list field is a transaction identifier or a generation identifier. This is identified in FIG. 5 by a branch block.

If it is a generation identifier, the generation tree adjoining the data access path is evaluated on the basis of the procedure EVAL__GENTREE and the physical pointer corresponding to the generation identifier is then returned to the data object.

If the identifier ID is a transaction identifier, the procedure ALLOC__TGSE is called up, which prepares a subsequent writing action by a procedure SET, and the data object is barred with respect to other transactions.

A user-specific data module GMI comprises furthermore a procedure SET, which modifies a data object within a transaction. Input parameters of this procedure are a transaction identifier TA__ID, a logical key for leading through the data access path and a pointer to the data to be newly taken over as well as an indication of the length of the new data. The initial parameter is a parameter for acknowledgements FIG. 7 shows a procedure SET which, like the procedure GET, comprises data access, which is carried out with the aid of the procedures RD__BLK and ACCESS__OCI. Once data access has been carried out, the procedure SET calls up the procedure ALLOC__TGSE, which is contained in the control access control system CTCC, requests a new access control data structure TGSE and copies the new data or the new data object into the separating-filter structure. If the procedure SET was prepared by the procedure GET, the assignment of a new access control data structure does not take place.

The user-specific data modules comprise furthermore a procedure CREATE, which extends an object class by a data object, and a procedure DELETE, which reduces an object class by a data object. The two the procedures are of no significance for the description of the invention and are therefore not explained in any more detail.

Although other modifications and changes may be suggested by those skilled in the art, it is the intention of the inventors to embody within the patent warranted hereon all changes and modifications as reasonably and properly come within the scope of their contribution to the art.

We claim:

1. A data management system, comprising:

a) a user-independent generic base system, which includes a central control system and at least one generic data module, b) a central access control system, which is contained in said central control system and is connected to control accesses to user data on a central level, c) a local access control system, which in each case is contained in a generic data module, and which is connected to control accesses to user data on a local level, said local access control system thereby cooperating correspondingly with said central access control system, d) a user-specific data module system, d1) which includes at least one user-specific data module, said at least one user-specific data module being produced by defining user-specific data types from a generic data module, and d2) which includes at least one user access procedure, which is exported with respect to a user system, and which represents the only interface of a user system to the data management system.

2. A data management system as claimed in claim 1, wherein a user access procedure is built up from a combination of standard access procedures, said standard access procedures being contained in said local access control system and containing an interface to said central access control system.

3. A data management system as claimed in claim 1, wherein the data management system includes a saving system, which comprises a backup storage for saving user data, and which is called up exclusively from said access control system.

4. A data management system as claimed in claim 1, wherein said data management system is integrated in a real-time system and includes a distribution system which distributes updated user data to various processors of the read-time system on a basis of user accesses, and which is called up exclusively from said access control system.

* * * * *